United States Patent
Livesey et al.

(10) Patent No.: US 10,093,841 B2
(45) Date of Patent: Oct. 9, 2018

(54) COMPOSITIONS AND METHODS FOR ENHANCING GRIP

(71) Applicants: Christopher Livesey, Amelia, VA (US); Jesse Lyman, Cherry Hill, NJ (US); Matt Vieke, Boca Raton, FL (US)

(72) Inventors: Christopher Livesey, Amelia, VA (US); Jesse Lyman, Cherry Hill, NJ (US); Matt Vieke, Boca Raton, FL (US)

( * ) Notice: Subject to any disclaimer, the term of this patent is extended or adjusted under 35 U.S.C. 154(b) by 0 days.

(21) Appl. No.: 15/603,734

(22) Filed: May 24, 2017

(65) Prior Publication Data

US 2017/0349796 A1    Dec. 7, 2017

Related U.S. Application Data

(60) Provisional application No. 62/344,628, filed on Jun. 2, 2016.

(51) Int. Cl.
| | | |
|---|---|---|
| *C09K 3/14* | (2006.01) | |
| *C09D 5/00* | (2006.01) | |
| *C09D 193/00* | (2006.01) | |
| *C09D 7/65* | (2018.01) | |
| *C08L 91/06* | (2006.01) | |

(52) U.S. Cl.
CPC ............... *C09K 3/149* (2013.01); *C09D 5/00* (2013.01); *C09D 7/65* (2018.01); *C09D 193/00* (2013.01); *C08L 91/06* (2013.01)

(58) Field of Classification Search
CPC . C09K 3/149; C09D 5/00; C09D 7/65; C09D 193/00; C08L 91/06
See application file for complete search history.

(56) References Cited

U.S. PATENT DOCUMENTS

| | | | | |
|---|---|---|---|---|
| 2,949,374 A | * | 8/1960 | Kendall | C09G 1/02 106/10 |
| 3,150,048 A | * | 9/1964 | Hollub | A61K 8/25 424/61 |
| 4,563,218 A | * | 1/1986 | Schuler | C09K 3/149 106/230 |
| 6,656,257 B2 | * | 12/2003 | Cohen | A61K 8/25 106/272 |
| 8,357,236 B1 | * | 1/2013 | Virgillitti | B29C 67/241 106/245 |
| 9,782,887 B2 | * | 10/2017 | Jaskolski | B25G 1/10 |
| 9,868,887 B1 | * | 1/2018 | Jaskolski | C09K 3/149 |
| 2006/0107870 A1 | * | 5/2006 | Barnes | C08L 91/06 106/270 |
| 2017/0190145 A1 | * | 7/2017 | Ballenas | B32B 9/02 |

FOREIGN PATENT DOCUMENTS

| | | | |
|---|---|---|---|
| CN | 105349048 A | * | 2/2016 |
| CN | 105462346 A | * | 4/2016 |
| SU | 1664819 A1 | * | 7/1991 |
| WO | WO 2006/008066 A1 | * | 1/2006 |

OTHER PUBLICATIONS

Clauss, Francis J., "Solid Lubricants and Self-Lubricating Solids", Academic Press, Inc. 1972 (p. 22).*
http://itac2/faqs pp. 1-4 Jun. 9, 2017.
http://griptecsport.com/about-griptec/ pp. 1-2 Jun. 9, 2017.

* cited by examiner

*Primary Examiner* — Anthony J Green
(74) *Attorney, Agent, or Firm* — Licata & Tyrrell P.C.

(57) ABSTRACT

Compositions for enhancing an individuals' grip to an item or the grip of an item and methods for their use and production are provided.

6 Claims, No Drawings

COMPOSITIONS AND METHODS FOR ENHANCING GRIP

This patent application claims the benefit of priority from U.S. Provisional Application Ser. No. 62/344,628, filed Jun. 2, 2016, which is hereby incorporated by reference in its entirety.

FIELD OF THE INVENTION

Compositions and methods for enhancing an individual's grip to an item and/or the grip of an item to a surface are provided.

BACKGROUND OF THE INVENTION

Various products are available for enhancing grip of athletes.

iTac2 is described as working like an invisible glove turning every square inch of your hands into a gripping surface. iTac2 contains organic beeswax and provides a water repellent surface.

GripTec is described as an aggressive non-slip formulation made using natural ingredients.

SUMMARY OF THE INVENTION

An aspect of the present invention relates to a composition for enhancing an individual's grip to an item. In one nonlimiting embodiment, the composition of the present invention comprises a wax, a resin, a solvent, and a softening agent. In another nonlimiting embodiment, the composition comprises a wax and two or more softening agents.

Another aspect of the present invention relates to a method for enhancing an individual's grip to an item. The method comprises applying a composition of the present invention to the individual's hands or feet or to the item to be gripped.

Another aspect of the present invention relates to a method for producing a composition for enhancing an individual's grip to an item, wherein the composition comprises a wax, a resin, a solvent, and a softening agent or a wax and two or more softening agents.

These compositions can also be used as a coating applied to, for example, industrial items to enhance their grip.

Accordingly, another aspect of the present invention relates to compositions and methods for enhancing grip of an item by applying a coating of a composition of the present invention to the item.

DETAILED DESCRIPTION OF THE INVENTION

The present invention relates to compositions and methods for use of these compositions in enhancing an individual's grip to an item. Compositions of the present invention are hydrophobic and therefore naturally repellant to water. Accordingly, the compositions allow for enhanced grip even when an individual is wet or sweating.

In one nonlimiting embodiment, the composition is used by an athlete in a sport where grip can increase athletic performance. Examples of such sports include, but are not limited to, baseball, tennis, golf, wrestling, football, weightlifting, gymnastics, cheerleading, ultimate frisbee, lacrosse, water polo, field hockey, cross fit, rugby, and diving.

The present invention also relates to compositions and methods for enhancing grip of an item by applying a coating of a composition of the present invention to the item. Nonlimiting examples of items to which the composition can be applied as a coating to enhance grip of the item include industrial items such as skids, pallets and tools.

Use of the terms "a" or "an" herein is meant to be inclusive of one or more.

In one nonlimiting embodiment, the composition of the present invention comprises a wax, a resin, a solvent, and a softening agent.

Waxes useful in the present invention are malleable, hydrophobic and compatible with the resin used in the composition. In one nonlimiting embodiment, the wax is beeswax. In one nonlimiting embodiment, the beeswax is Australian beeswax. However, as will be understood by the skilled artisan upon reading this disclosure, other waxes with comparable friction coefficients to beeswax can be used and are encompassed by the present invention.

In one nonlimiting embodiment, the wax makes up about 30% and about 90% of the total weight of the composition. In one nonlimiting embodiment, the composition comprises at least 50% by total weight of the composition of wax.

Resins useful in the present invention are sticky, compatible with the wax, and are soluble in lipids/esters. In one nonlimiting embodiment, the resin is a pine resin. In one nonlimiting embodiment, the pine resin is refined and crystallized from Georgia slash pine trees. However, as will be understood by the skilled artisan upon reading this disclosure, alternative resins with comparable stickiness, solubility and compatibility can be used and are encompassed by the present invention.

Solvents which can be used in the compositions include any relatively non-irritating solvent capable of dissolving the resin in a concentrated solution of at least 1:1 resin:solvent or at least 2:1 resin:solvent. Nonlimiting examples of solvents useful in the composition include isopropyl alcohol, acetone, octyldodecanol, and 1,3 propanediol. However, as will be understood by the skilled artisan upon reading this disclosure, alternative solvents capable of dissolving the resin can be used and are encompassed by the present invention.

In one nonlimiting embodiment, the resin is dissolved in the solvent prior to addition to the composition of the present invention. In one nonlimiting embodiment, the resin is dissolved in the solvent at a ratio of 1:1 resin:solvent. In one nonlimiting embodiment, the resin is dissolved in the solvent at a ratio of 2:1 resin:solvent. In one nonlimiting embodiment, the resin dissolved in the solvent makes up at least about 5 to about 30% of the total weight of the composition. In one nonlimiting embodiment, the resin dissolved in the solvent makes up at least 14% of the total weight of the composition.

Softening agents useful in the present invention include any relatively non-irritating agent which exhibits low volatility and blends well with the wax at lower temperatures and shorter time periods to lower viscosity of the composition without degrading the wax and separating upon storage. A wide range of softening agents can be used. Nonlimiting examples include hydrocarbons, esters, aromatics, paraffinic compounds, ketones, alcohols, petroleum jelly, vegetable oils and coconut oil. A nonlimiting example of a useful softening agent is amyl acetate due to its toxicological profile and volatility. Another nonlimiting example of a useful softening agent is petroleum jelly. In one nonlimiting embodiment, the composition comprises about 25% to about 75% by total composition weight of one or more softening agents. In one nonlimiting embodiment, the composition comprises at least 30% by total composition weight of a softening agent.

In another nonlimiting embodiment, the composition of the present comprises a wax as described supra and two or more softening agents.

A nonlimiting example of two or more softening agents useful in this embodiment is amyl acetate and petroleum jelly.

The present invention also relates to a method for producing these compositions.

In one nonlimiting embodiment, the method involves melting the wax to a temperature which does not exceed 80° C. In one nonlimiting embodiment, the wax is melted in a water bath. Resin is then dissolved in the solvent and the resin and solvent solution is added to melted wax and mixed thoroughly. The softening agent is then added to this mixture and again mixed thoroughly.

In an alternative nonlimiting embodiment, the method involves melting the wax to a temperature which does not exceed 80° C. Once the wax is full melted, a first softening agent is weighed, heated until liquid, and added with stirring to the melted wax. After mixing thoroughly, the second softening agent is then added to this mixture and again mixed thoroughly.

As will be understood by the skilled artisan upon reading this disclosure, the order in which these components are added may be altered and is still within the scope of the present invention. The final mixture is then poured into its final container and allowed to cool.

The present invention also relates to methods for enhancing an individual's grip to an item with these compositions. In one nonlimiting embodiment, the composition is applied directly to the skin of the individual, for example on their hands or feet. In another nonlimiting embodiment, the composition is applied to the item to be gripped. In one nonlimiting embodiment, the composition is used by an athlete in a sport where grip can increase athletic performance. Examples of such sports include, but are not limited to, baseball, tennis, golf, wrestling, football, weight-lifting, gymnastics, cheerleading, ultimate frisbee, lacrosse, water polo, field hockey, cross fit, rugby, and diving. Because of the hydrophobicity of the composition, it is naturally water repellent. Accordingly, the compositions provides for enhanced grip even when an individual is wet or sweating.

The present invention also relates to methods for enhancing grip of an item by applying a coating of a composition of the present invention to the item. Nonlimiting examples of items to which the composition can be applied as a coating to enhance grip of the item include industrial items such as skids, pallets and tools.

The following nonlimiting examples are provided to further illustrate the present invention.

EXAMPLES

Example 1: Production of Resin Containing Composition

The amount of wax required for the formulation was massed and heating of the wax was begun in a vessel via water bath. The wax was permitted to fully melt while ensuring that the temperature did not exceed 80° C. to prevent degradation of the wax. The required amount of resin in solvent was massed and then added and mixed as soon as the wax was melted. The required amount of softening agent was massed and added to the mixture. Once completely mixed, the heat source was removed. While still hot, the mixed composition was poured into desired containers and allowed to cool.

Example 2: Methods for Assessment of Hydrophobicity

The product iTac2 was used as a qualitative benchmark for assessing and adjusting formulations. The hydrophobicity was assessed by properly applying both products to the subject's hands (one on each hand). The hands were then flushed under running water and pulled slowly from the stream. The two were then compared visually for the amount of water that was left behind and by visually assessing how round the water droplets left behind were.

A quantitative assessment of hydrophobicity can be performed by measuring the contact angle of a droplet on a solid surface coated with material. If water contact angle on a solid surface is greater than 90° then the substance is considered hydrophobic, the larger the contact angle the greater the hydrophobicity.

Example 3: Methods for Assessment of Feel

The feel of the product is related to the softness or creaminess of the product to the consumer. This was also assessed qualitatively by comparison to iTac2 to better understand the texture and pliability of the product. Parameters considered included how easy the product was to get out of the container and then how easily it spread onto the hands of the tester compared to one another.

A quantitative assessment of feel is performed via a texture analyzer which is a device that works similar to a Brookfield viscometer. This device uses a selected probe that rotates at a known speed and depth of penetration. This then measures force from rotational resistance.

Example 4: Methods for Assessment of Grip

The grip of the product was qualitatively graded based on comparison to iTac2. The products were applied properly on the testers hands between the thumb and the index finger. The tester then tried to slide their thumb down their index finger and feel the resistance (friction) between the two, giving the formulation a grade based on the comparison.

Grip is assessed quantitatively using an apparatus to measure the coefficient of static friction. This is easily calculated from the movement of two planes against one another at a known angle and height, changing the mass of the top plane until it begins to slide against the lower plane, and then using kinematic equations to derive the static friction coefficient.

Example 5: Qualitative Comparison of Hydrophobicity, Feel and Grip of Compositions Table 1 provides results of the qualitative assessment of hydrophobicity, feel and grip of iTac2 as compared to a composition of the present invention (EXAMPLE 1) and alternative compositions (COMP. EX. 1-16).

TABLE 1

| Materials | (g) | hydrophobicity | Feel | Grip | Comments |
|---|---|---|---|---|---|
| COMP. EX. 1 | | | | | |
| Aus. Bees Wax | 17 | 8 | 5 | 6 | Hydrophobicity is excellent, product is very hard compared to benchmark and grip is subpar/too sticky |
| AA PS High | 4 | | | | |
| COMP. EX. 2 | | | | | |
| Aus. Bees Wax | 17 | 8 | 5 | 4 | Grip is still poor, stickiness is definitely better |
| AA PS Low | 4 | | | | |
| COMP. EX. 3 | | | | | |
| Aus. Bees Wax | 14 | 6 | 7 | 6 | Product is much softer, grip is still poor and sticky compared to benchmark. Products durability is decreased |
| AA PS High | 7 | | | | |
| COMP. EX. 4 | | | | | |
| Aus. Bees Wax | 14 | 6 | 7 | 4 | Amyl acetate is improving the softness of the product |
| AA PS Low | 7 | | | | |
| COMP. EX. 5 | | | | | |
| Aus. Bees Wax | 12 | 6 | 7 | 5 | Easy application but hydrophobicity and grip is decreased, product is very sticky |
| AA PS High | 9 | | | | |
| COMP. EX. 6 | | | | | |
| Aus. Bees Wax | 12 | 6 | 8 | n/a | Grip is none existent |
| AA PS Low | 9 | | | | |
| COMP. EX. 7 | | | | | |
| Aus. Bees Wax | 10 | 4 | 8 | n/a | Grip still not ideal strength |
| AA PS High | 10 | | | | |
| COMP. EX. 8 | | | | | |
| Aus. Bees Wax | 10 | 4 | 8 | n/a | Still too slick |
| AA PS Low | 10 | | | | |
| EXAMPLE 1 | | | | | |
| Aus. Bees Wax | 16.5 | 8 | 7 | 9 | Excellent hydrophobicity, product takes longer to apply but is not too tough, grip is comparable to benchmark |
| PS IPA | 4.5 | | | | |
| Amyl Acetate | 11 | | | | |
| COMP. EX. 9 | | | | | |
| Aus. Bees Wax | 16.5 | 9 | 5 | 9 | Decreasing amyl acetate definitely makes the product much harder to remove from container and to apply/spread |
| PS IPA | 4.5 | | | | |
| Amyl Acetate | 5.5 | | | | |
| COMP. EX. 10 | | | | | |
| Aus. Bees Wax | 16.5 | n/a | 2 | n/a | too hard to apply |
| PS IPA | 4.5 | | | | |
| Amyl Acetate | 2 | | | | |
| COMP. EX. 11 | | | | | |
| Aus. Bees Wax | 16.5 | 8 | 8 | 5 | Grip still not ideal, but the texture and hydrophobicity are pretty decent |
| PS IPA | 2 | | | | |
| Amyl Acetate | 11 | | | | |
| COMP. EX. 12 | | | | | |
| Aus. Bees Wax | 16.5 | 8 | 6 | 6 | The texture was not pliable |
| PS IPA Conc. | 2 | | | | |
| Amyl Acetate | 5.5 | | | | |

TABLE 1-continued

| Materials | (g) | hydrophobicity | Feel | Grip | Comments |
|---|---|---|---|---|---|
| COMP. EX. 13 | | | | | |
| Aus. Bees Wax | 16.5 | | n/a | | too hard to apply |
| PS IPA Conc. | 2 | | | | |
| Amyl Acetate | 2 | | | | |
| COMP. EX. 14 | | | | | |
| Aus. Bees Wax | 16.5 | 8 | 6 | 9 | Product is excellent overall for texture and hydrophobicity. Application is easy, product has a tendency to flake more and is unpleasantly sticky |
| PS IPA Conc. | 6.5 | | | | |
| Amyl Acetate | 11 | | | | |
| COMP. EX. 15 | | | | | |
| Aus. Bess Wax | 16.5 | 8 | 6 | 8 | Texture not pliable |
| PS IPA Conc. | 6.5 | | | | |
| Amyl Acetate | 5.5 | | | | |
| COMP. EX. 16 | | | | | |
| Aus. Bess Wax | 16.5 | | | 3 | No grip was evident nor was it hydrophobic |
| PS IPA Conc. | 6.5 | | | | |
| Amyl Acetate | 2 | | | | |

As shown be this study, the composition of the present invention exhibited excellent hydrophobicity, was applied relatively easily and enhanced grip.

Example 6: Production of Composition with Two Softening Agents

Organic AU beeswax (105-125 grams) was measured out and heated via a water bath in such a way that wax temperature was not in excess of 80° C. When beeswax was fully melted, clear and fluid, petroleum jelly (30.25-46.25) was weighed out, heated until liquid, and added with stirring to the melted beeswax. After approximately 2 minutes of stirring, amyl acetate (22.54-38.54 grams) was added to the petroleum jelly and beeswax mixture and strong stirring was applied for another 2 minutes. The heat was then turned off and the mixture was allowed to cool in the water bath with continued mixing until the product was semi-solid.

What is claimed is:

1. A method for enhancing an individual's grip to an item, said method comprising applying a composition to the individual's hands or feet or to the item to be gripped, said composition comprising:
   beeswax;
   a resin dissolved in a solvent prior to addition to the composition; and
   an additional nonirritating agent which lowers viscosity of the composition without degrading the beeswax and separating upon storage.

2. A method for producing a composition comprising beeswax, resin dissolved in a solvent prior to addition to the composition, and an additional nonirritating agent which lowers viscosity of the composition without degrading the beeswax and separating upon storage, said method comprising
   (a) melting the beeswax to a temperature which does not exceed 80° C.;
   (b) dissolving resin in the solvent;
   (c) adding the resin and solvent solution to the melted beeswax and mixing thoroughly;
   (d) adding the additional agent to the mixture of step (c) and mixing thoroughly;
   (e) pouring the mixture of step (d) into a final container; and
   (f) allowing the mixture to cool in the container.

3. A method for enhancing an individual's grip to an item, said method comprising applying a composition comprising beeswax and two or more softening agents to the individual's hands or feet or to the item to be gripped wherein at least one of the softening agents is amyl acetate.

4. A method for enhancing grip of an item by applying a coating of a composition comprising beeswax and two or more softening agents to the item wherein at least one of the softening agents is amyl acetate.

5. A method for producing a composition comprising beeswax and two or more softening agents, said method comprising
   (a) melting the beeswax to a temperature which does not exceed 80° C.;
   (b) melting and adding a first softening agent to the melted beeswax with mixing;
   (c) adding the second softening agent to the mixture of step (b) and mixing thoroughly;
   wherein at least one of the first or second softening agents is amyl acetate;
   (d) pouring the mixture of step (c) into a final container; and
   (e) allowing the mixture to cool in the container.

6. A method for enhancing grip of an item by applying a coating of a composition to the item, said composition comprising:
   beeswax;
   a resin dissolved in a solvent prior to addition to the composition; and an additional nonirritating agent which lowers viscosity of the composition without degrading the beeswax and separating upon storage.

* * * * *